(12) United States Patent
Davis et al.

(10) Patent No.: US 7,386,507 B2
(45) Date of Patent: Jun. 10, 2008

(54) LOAN PROGRAM AND PROCESS FOR TRANSACTING THE SAME

(76) Inventors: Richard S. Davis, 11894 Candy Rose Way, San Diego, CA (US) 92131; Michael J. Maron, 12804 Baywind Point, San Diego, CA (US) 92130

( * ) Notice: Subject to any disclaimer, the term of this patent is extended or adjusted under 35 U.S.C. 154(b) by 0 days.

(21) Appl. No.: 11/859,553

(22) Filed: Sep. 21, 2007

(65) Prior Publication Data

US 2008/0005001 A1 Jan. 3, 2008

Related U.S. Application Data

(63) Continuation of application No. 11/690,694, filed on Mar. 23, 2007.

(51) Int. Cl.
*G06Q 40/00* (2006.01)
(52) U.S. Cl. ............................. 705/38; 705/35; 705/40
(58) Field of Classification Search .................. 705/35, 705/38
See application file for complete search history.

(56) References Cited

U.S. PATENT DOCUMENTS

| 5,206,803 | A | 4/1993 | Vitagliano et al. |
| 6,397,196 | B1 | 5/2002 | Kravetz et al. |
| 6,473,500 | B1 | 10/2002 | Risafi et al. |
| 6,764,013 | B2 | 7/2004 | Ben-Aissa |
| 7,191,149 | B1 | 3/2007 | Lanham et al. |
| 7,229,013 | B2 | 6/2007 | Ben-Aissa |
| 2001/0034676 | A1 | 10/2001 | Vasic |
| 2002/0082987 | A1* | 6/2002 | Wilson ........................ 705/39 |
| 2002/0091600 | A1 | 7/2002 | Kravetz et al. |
| 2003/0065618 | A1 | 4/2003 | VanDeBoe, Jr. |

(Continued)

FOREIGN PATENT DOCUMENTS

JP       20044253010        9/2004

(Continued)

OTHER PUBLICATIONS

The John Warner National Defense Authorization Act (Also referred to as the Talent Amendment, Public Law 109-364). Bankers Online. http://www.bankersonline.com/regs/jwnda/jwnda.html p. 1-4.*

(Continued)

*Primary Examiner*—James P. Trammell
*Assistant Examiner*—Jamie H Swartz
(74) *Attorney, Agent, or Firm*—Black Lowe & Graham, PLLC

(57) ABSTRACT

A loan program and process is structured to provide a significant end-to-end cost savings while overcoming many, if not all, of the drawbacks and regulatory obstacles present in the current payday loan industry. The program, the end-to-end process, and the arrangement thereof, permits a lender to offer short-term, small cash loans to employees through an employer controlled payroll system. Access to the employer controlled payroll system is achieved through an agreed upon relationship between a coordinator, a lender, and the employer. As part of the agreed upon relationship, the lender guarantees that all fees, interest, and other ancillary costs over and above a principle amount of the short-term, small cash loan will be kept at or below a predetermined annual percentage rate (APR). In addition, the loan is repayable over a number of payroll cycles such that each successive payday the principle balance of the loan decreases.

10 Claims, 9 Drawing Sheets

U.S. PATENT DOCUMENTS

| | | |
|---|---|---|
| 2003/0074311 A1 | 4/2003 | Saylors et al. |
| 2004/0088247 A1* | 5/2004 | Grant et al. .................. 705/38 |
| 2004/0111370 A1 | 6/2004 | Saylors et al. |
| 2004/0225545 A1 | 11/2004 | Turner et al. |
| 2005/0075969 A1* | 4/2005 | Nielson et al. ............... 705/38 |
| 2005/0109836 A1 | 5/2005 | Ben-Aissa |
| 2006/0059084 A1* | 3/2006 | Tucker ........................ 705/38 |
| 2006/0059085 A1 | 3/2006 | Tucker |
| 2006/0129478 A1 | 6/2006 | Rees |
| 2006/0161499 A1 | 7/2006 | Rich et al. |
| 2006/0253474 A1* | 11/2006 | Hotchkiss et al. .......... 707/100 |
| 2006/0282373 A1 | 12/2006 | Stone |
| 2006/0282374 A1 | 12/2006 | Stone |
| 2006/0282375 A1 | 12/2006 | Stone |
| 2007/0061255 A1 | 3/2007 | Epting et al. |
| 2007/0156577 A1 | 7/2007 | Lanham et al. |
| 2007/0244778 A1 | 10/2007 | Bailard |

OTHER PUBLICATIONS

Barr, Michael. Banking the Poor. Yale Journal on Regulation. Winter 2004. p. 1-41.*

C. Conkey, Payday Lenders Strike a Defensive Pose, The Wall Street Journal, Feb. 21, 2007.

M. Gardner, Payday Lenders Will End Loans to Military, http://www.SignOnSanDiego.com (citing Copley News Service), Mar. 19, 2007.

S. Bair, North Carolina State Employees' Credit Union: Salary Advance Loan, Annie E. Casey Foundation Report; (2005) pp. 21-22.

C. A. Coelho & B. Funchal, Strategic Default and Personal Credit: The Brazilian Natural Experiment; (2006) pp. 1-4.

Human Resources Manual, University Policies, Payroll Advances, Georgetown University, Human Resources, Employment Services (1997).

* cited by examiner

| | | |
|---|---|---|
| INITIAL LOAN | INITIAL LOAN REQUEST | $300 |
| | LOAN FEE ($25 / $100 BORROWED) | $ 75 |
| | NET CASH TO BORROWER | $225 |
| PAYDAY #1 | REQUESTED ROLL OVER AMOUNT | $300 |
| | LENDER FEE | $ 75 |
| | NET CASH TO BORROWER | $ 0 |
| PAYDAY #2 | REQUESTED ROLL OVER AMOUNT | $300 |
| | LENDER FEE | $ 75 |
| | NET CASH TO BORROWER | $ 0 |
| PAYDAY #3 | REQUESTED ROLL OVER AMOUNT | $300 |
| | LENDER FEE | $ 75 |
| | NET CASH TO BORROWER | $ 0 |
| PAYDAY #4 | REQUESTED ROLL OVER AMOUNT | $300 |
| | LENDER FEE | $ 75 |
| | NET CASH TO BORROWER | $ 0 |
| PAYDAY #5 | REQUESTED ROLL OVER AMOUNT | $300 |
| | LENDER FEE | $ 75 |
| | NET CASH TO BORROWER | $ 0 |
| PAYDAY #6 | REQUESTED ROLL OVER AMOUNT | $300 |
| | LENDER FEE | $ 75 |
| | NET CASH TO BORROWER | $ 0 |
| PAYDAY #7 | REQUESTED ROLL OVER AMOUNT | $300 |
| | LENDER FEE | $ 75 |
| | NET CASH TO BORROWER | $ 0 |
| PAYDAY #8 | REQUESTED ROLL OVER AMOUNT | $300 |
| | LENDER FEE | $ 75 |
| | NET CASH TO BORROWER | $ 0 |
| PAYDAY #9 | BORROWER PAYS OFF LOAN | $300 |
| | FINAL LOAN BALANCE | $ 0 |
| | CUMULATIVE FEES OVER LIFE OF THE LOAN | $675 |

FIG.1
(PRIOR ART)

LOAN PROGRAM AND PROCESS FOR TRANSACTING THE SAME

RELATED APPLICATIONS

This application claims priority to and is a continuation of U.S. patent application Ser. No. 11/690,694 filed Mar. 23, 2007, which is incorporated herein by reference in its entirety.

FIELD OF THE INVENTION

This invention relates generally to a program and process for short-term loans, and more specifically, to a program and process of administering a short-term loan for an employee where the loan is amortized over a number of payback periods.

BACKGROUND OF THE INVENTION

A growing segment of lower and middle class people are under stress to meet monthly obligations such as rent, groceries, gas, and rising interest rates on adjustable mortgages. Meeting such monthly obligations is difficult enough and often leaves these people with little room, if any, for adapting to emergencies or other unexpected costs. In addition, many of these people are often perceived as credit risks.

Traditionally, banks and credit unions are the source of small loans to consumers. However, since deregulation of the banking industry in 1980, profit pressure has forced many banks to closely scrutinize unprofitable products. Many branches have closed in lower income neighborhoods where on-deposit amounts couldn't justify branch cost. A number of banks merged during the past two decades to achieve cost efficiency in scale. And loan products that were not stand-alone profitable were discontinued. As banks are governed by their state of incorporation usury law, an annual percentage rate (APR) cap must be adhered to when pricing interest. In addition, safety and soundness rules governing the acceptance of loan applications means that banks may spend in a range of about $100 to $200 internally to originate one consumer loan. The internal costs include credit checks, income verification, collateral securitization, paperwork processing, etc. In order to be profitable, banks must recuperate these internal costs while still adhering to APR pricing regulations. The only feasible way to recoup such internal costs is for the banks to loan substantially large sums of money over many months. As a result, commercial banks will typically lend a minimum of $2,500 over a minimum of 24-36 months. This size of loan, combined with the number of periods outstanding and APR rates, allow banks to recover their internal costs and turn a profit. As such, banks have naturally avoided short term, small dollar loans. Given their APR usury caps and internal costs—there is practically no way for commercial banks to profitably lend small credit over a period of only a few weeks.

For Americans who are cash strapped, at their credit card limit, and who simply need "bridge" funds to tide them over till the next paycheck—small loans are an essential financial product. They cannot find this class of credit at their traditional bank. An industry, commonly referred to as the "payday lending" or "payday loan" industry, has stepped in to fill a need for these people by providing early access to needed money through short term, high interest payday loans. The technical banking term for this type of transaction is called a "short-term deferred deposit loan." Over the past decade, the payday lending industry has grown to generate a loan volume of about $40-Billion per annum where the fees received from this loan volume are about $6-Billion per annum. One reason for the growth, success, and staying power of the payday lending institutions is that mainstream banks and credit unions cannot affordably originate, transact, and manage small, short-term cash loans. In short, the transaction costs for the banks and credit unions are invariably too high in view of the requested loan amounts and further in view of the real or perceived credit risk. One way the payday lending industry deals with this conundrum and minimizes its risk is to couple the loan to the individual's paycheck and make the duration of the loan no more than one paycheck cycle (i.e., the individual must pay off the loan with the next paycheck received).

Due to the practices of the payday lending industry, many individuals find themselves trapped in a downward, financial spiral. It has been estimated that over 6,000,000 people access "payday loans" as a source of cash, some for legitimate emergencies and others to simply meet the financial demands of everyday life. At present, the only avenue for these people to obtain short term loans is to subject themselves to the practices and fees of the payday lending industry.

The payday lending industry started as small, individually owned neighborhood shops that offered two week loans (ranging from $300-$500) in exchange for a fee. Borrowers would sign an agreement and provide a post-dated personal check for the amount borrowed and return at their next payday to repay, in cash, the loan amount or alternatively authorize the lender to cash the post-dated personal check. In exchange and after a verification of the borrower's employment and residency information, the shop owner (i.e., lender) would front the cash less a loan fee. Typically, the fee is between about $15-$25 per $100 borrowed. By way of example, a $300 loan request minus the fee would yield net cash to the borrower of about $225-$255. According to the Colorado chapter of PIRG (Public Interest Research Group), the typical payday lender charged consumers an Annual Percentage Rate (APR) of 470% and an average fee of $18.28 to borrow $100 for two weeks. See http://www.tomorrowsmoney.org/youngpeople/section.cfm/400/2531.

One operating tenet of the payday lending industry is that the full amount of the payday loan must be repaid on the borrower's next payday. Often, the lender provides a reminder to the borrower shortly before the loan becomes due and payable. Inevitably, some borrowers find that they are unable to repay the loan in full on or before the next payday. The lenders have dealt with this dilemma by allowing the borrower to "rollover" their outstanding loan. Many times, this rollover is done by the same lender. The lender simply executes a new agreement for the amount of the outstanding loan with a new fee and gives the borrower till the next payday to repay.

Multiple consumer organization studies indicate that this rollover behavior happens, on average, about nine times per loan. Referring to FIG. 1 and using the example provided above with an initial loan request of $300 having a loan fee of $25 fee per $100 borrowed and assuming that the borrower rolls the entire loan amount over each time, the cumulative fees for rolling the loan over nine times would be $675 to the borrower. This example shows that the fees for rolling the loan over can and often do exceed the original loan amount. In this example, the fees exceed the initial loan request of $300 by 225%. The practice of rolling over payday loans has been referred to as the "debt spiral" because it traps the borrowers into a pattern of refinancing an extremely expensive cash loan past the initial payback period. For the lenders, it is advantageous and profitable to have as many loan transactions as possible.

There have been legislative efforts by some jurisdictions to limit or restrict the practice of rolling over payday loans. However, handshake agreements between lenders and desperate borrowers have found other ways to perpetuate the "debt spiral." Referring to an example shown in FIG. 2, a borrower makes a first loan request of $300 and is granted the first loan from a first lender, minus a $75 loan fee. When the first loan becomes due and payable on the next payday, the borrower may already know or may simply be referred to a second lender. The borrower executes a second loan in the amount of $400 and is granted the second loan from the second lender, minus the $100 loan fee of course. Thus, the borrower takes the $300 net cash, returns to the first lender and pays off the first loan with the first lender. On the next payday, the borrower finds themselves unable to payoff the second loan, so the borrower goes through the process again with either the first lender or with a third lender and the cycle continues for as long as the borrower can qualify for the increased loan amounts. In just the three identified transactions, the cumulative fees totaled to $300 and the borrower's payoff balance has nearly doubled from $300 to $525.

The payday lending industry operates in both brick and mortar infrastructure and through online portals. Some lenders operate exclusively online believing that the operating and transaction costs for servicing payday type loans is lower because there are no leased buildings, fewer employees, and no concerns about securing and handling physical stores of cash. In addition, the online lender is not limited to relying on local customers because the online lender has the ability to reach a vast pool of potential customers—anyone with access to the internet, for example. Theoretically, the online lender could reach a large pool of customers and then amortize the associated transaction costs into lower fees for the borrowers.

FIG. 3 shows an example of the relative operating costs for a brick and mortar lender 10 compared to an online lender 12. The infrastructure and labor costs 14 are estimated to be, on average, significantly higher for the brick and mortar lender 10 than they are for the online lender 12. As briefly mentioned above, the brick and mortar lender 10 has capital costs, equipment costs, lease or building acquisition costs, labor costs, security costs, money handling costs, etc.

Write off costs 16, which are the costs that must be absorbed when the borrower defaults on the loan, are estimated to be about the same for the brick and mortar lender 10 and the online lender 12. Conventionally and quite commonly, the lender 10, 12 mitigates the risk of default or insufficient funds by requiring the borrower to identify their next payday and executing an agreement for an electronic funds transfer (EFT) from the borrower's bank or credit union account on that day. In some cases, the borrower, either purposefully or mistakenly, may provide a payday date that is incorrect. In such a situation, the borrower withdraws their money well before the EFT instructions are received by the bank or credit union. In other cases, the borrower simply does not have enough funds to payoff the loan and must default on at least a portion of the loan amount. In either scenario, the lenders 10, 12 must bear the costs of dealing with the defaulting borrower.

As for marketing and advertising costs 18, it is estimated that the brick and mortar lender 10 has significant advantages over the online lender 12. The brick and mortar lender 10 typically attracts new borrowers by simply being present and visible to the local citizens. By being located in a preferred location, the brick and mortar lender 10 may be able to generate and sustain a profitable business from the local population with little to no advertising costs. The online lender 12, on the other hand, has significant costs of attracting and ultimately acquiring new borrowers. Given the hundreds of competitors, the similarity of services, and the commodity nature of the money lending business, the online lender 12 must advertise heavily to differentiate from others and may also have to commit significant resources on search engine optimization to rise to the top of an internet search. In sum, the online lender 12 trades the infrastructure and labor costs 14 for an equal or more expensive challenge of attracting and acquiring new borrowers online.

There have been attempts to reduce the cost of acquiring new customers. For example, U.S. Published Patent Application No. 2005/0075969 to Neilson et al. (Neilson) discloses a payday loan process having independent, but related contracts. The lending entity enters into a first contract with an employer and a second contract with an employee. The first contract provides that if an employee takes out an advance with the lending entity, then the employer is obligated to deduct the advance amount and related fees from the next paycheck of the employee and send this on to the lending entity. The second contract is executed separately with the employee. The second contract obligates the employee to authorize the employer to deduct the loan payoff amount and any fees from the employee's next paycheck. One drawback of Neilson is that the payday loan process taught therein continues the practice of requiring full restitution of the payday loan on the next payday while extracting high loan fees from the borrower.

Many practices and aspects of the payday lending industry have presented challenging issues for governments and consumer advocates. There continues to be a strong desire and even a strong need for small, short term cash infusions for people, especially people in the lower income sections of society. In addition and as mentioned above, mainstream financial institutions are unable to profitably service small, short term payday loans, so the people needing these types of loans must suffice with the existing model. However, the excessive fees and interest associated with the payday loans, the unforeseen "debt spiral," and the practice of rolling over loans multiple times has severely damaged the reputation and efficacy of the payday lending industry.

In response to the practices and tactics of the payday lending industry with respect to military personal, the U.S. government recently enacted legislation and regulations capping the interest rate to 36.00 percent on small consumer cash loans. Thus, the loan fees associated with payday loans cannot be greater than an amortized APR of 36.00%. See Public Law 109-364, John Warner National Defense Authorization Act for Fiscal Year 2007. The term "interest" is defined to include all extra charges and fees of any kind, including the sale of related products such as credit insurance.

The new law prohibits requiring military members to set up an allotment as a condition of receiving a loan; requiring the use of a vehicle title as security for any loans made to service members and military family members; using a check or any other access to a member's financial account as security for a loan; lenders from renewing, repaying, refinancing, rolling over, or consolidating consumer credit using the proceeds of other credit granted by the same lender to the military member; requiring military members to waive their rights under the Servicemembers' Civil Relief Act (SCRA), or any other federal law; denying the opportunity for military members to pay the loan off early, and any penalties for early payments; any unreasonable clauses in the contract designed to make it difficult for military members to take a creditor to court; and states from allowing creditors to violate state consumer loan protection laws for military members who are nonresidents. In short, the new law effectively closes down payday lending operations around military bases and to military personnel.

Closing down the payday lending operations around the military bases, however, may not cure the problem. Similar to the borrower involved in a cycle of obtaining loans from a variety of lenders, it is anticipated that military personnel will still continue to find ways of obtaining short term payday loans. Since the payday loan shops around the bases can no longer provide the loans, it is anticipated that many military personnel will use online payday loan vendors. Some of the high-fee, online lenders may be out of reach of government laws, while others may claim that they were not aware the borrower was a member of the military. Thus, while closing down the payday loan shops around the bases may have some positive effects, it does not cure the underlying issues and problems. Instead, closing down the payday loan shops around the bases is likely to simply shift the business to another venue, such as to online vendors, where oversight and enforcement of regulations may be much more difficult.

Commercial banks, with multiple physical locations and online resources, have been unable to profitably transact and process short term loans. This is due, in part, because of the federal banking deregulation of 1980, which caused for-profit banks to become increasingly cost conscious and bottom-line minded. The customer segment that needed small, unsecured cash loans to meet occasional emergencies, posed several problems in the banking industry's business model. First, the effort to originate and underwrite a loan is relatively costly and banks must meet certain professional, safety, and soundness standards. To recoup the transaction costs and still make a profit, commercial banks found that they would typically have to exceed the state usury laws governing their charter. Because the emergency loan amount required was small and the repayment term short, the resulting APR rate triggered usury violations. Instead of trying to find an alternate model, for-profit banks have essentially abandoned the servicing of small, unsecured cash loans and have shifted their focus to a lower-risk target customer borrowing larger amounts over a longer period.

The payday lending industry operates under a business model, anticipated profit margin, and an overall business philosophy that prevents them from remodeling or even correcting some of the most glaring drawbacks within the industry. Although it is appreciated that small, short term cash loans may be a necessary survival tactic for some people, there is an urgent and overriding need for fundamental changes in the industry. In addition, there remains a need to provide military personnel small, short term cash loans within the boundaries of the new law, while keeping operating and transactions costs to a minimum.

SUMMARY OF THE INVENTION

The invention is generally directed a loan program and process structured to provide a significant end-to-end cost savings while overcoming many, if not all, of the drawbacks and regulatory obstacles present in the current payday loan industry. The program, the end-to-end process, and the arrangement thereof, permits a lender to offer short-term, small cash loans to employees in a traditionally amortizing structure while maintaining APR rates at or below typical consumer loan rates offered by mainstream banks today. In one embodiment, a loan system operated by a lender (e.g., bank or credit union) communicates with a payroll system of an employer to produce an automated origination process for the lender to receive loan applications from employees of the employer. Instead of the conventional and expensive safety and soundness review of each loan application, the lender may quickly authenticate the identity of the applicant, check for sufficient income to repay the loan, and instruct the employer's payroll system to securitize the repayment of an approved loan amount over a forthcoming number of repayment periods. By way of example, the loan program and process includes a method for amortizing small cash loans at a substantially lower cost compared with the costs currently being exacted from existing bank, credit union, and payday loan lenders. Another cost saving aspect is that the employer's payroll system may automatically instruct the lender where to transmit the loan funds in response to payroll direct deposit instructions on file. This usage of "on file" data also saves a step and cost to the Lender in administering the loan. The end-to-end integration of the loan program and process and the various aspects thereof substantially reduces loan origination, loan processing, and loan repayment costs. Thus, traditional lenders may now provide reduced-cost, small cash loans while avoiding many of the drawbacks discussed above.

Consequently, aspects of this invention focus on the delivery channel of the Employer as a "virtuous circle" to lower the cost of acquiring borrowers. Because employers desire to offer helpful benefits for employees and they have robust communication channels to drive awareness of them, the marketing cost of locating potential borrowers is born by the "host" employer in return for offering a safe, low fee loan program. This marketing burden accounts for well over half of the operating costs of today's online Payday Loan business. Thus, the lenders in this program simultaneously enjoy three enormous cost savings in exchange for their offer of traditionally amortizing, low-fee loans (1) marketing/awareness costs are born by the "host" employer who are motivated to furnish strong benefits and (2) origination costs to determine the credit worthiness of the applicant is fully automated through integration and query of the "host" employer payroll system and (3) repayment is guaranteed through integrated instructions for auto-deductions from the host Employer's payroll system.

In one aspect of the invention, a method of coordinating a loan program includes executing a contract between a first entity and an employer to provide a loan program that is offer-able as a benefit through the employer to employees of the employer, the contract having at least an agreed upon annual percentage rate per annum that includes fees, interest, and other ancillary costs, which taken in total provides an overall interest rate that is less than or equal to the agreed upon annual percentage rate per annum; and deducting loan payments directly from paychecks of the employees and transmitting the loan payments to a lending entity to reduce the representative outstanding loan balances of the employees with outstanding loans.

In another aspect of the invention, a method of providing a loan through a loan program includes receiving a loan request from an employee of an employer through a loan request system; determining a principle amount of the loan based on at least one underwriting parameter; determining a total amount of the loan based on an overall interest rate applied to the principle amount of the loan, wherein the overall interest rate is not greater than a threshold annual percentage rate per annum established by the employer; and determining a loan payment amount that allows for recouping the total amount of the loan over a predetermined number of payday cycles.

In yet another aspect of the invention, a method of receiving loan payments for a loan includes approving a loan request by an employee; determining a number of loan payments to be deducted from a paycheck of the employee by a payroll department, wherein a total value of an amortized number of loan payments includes a total amount of interest that does not exceed a threshold annual percentage rate per annum established by an employer; deducting at least one loan payment from the paycheck of the employee; and transmitting a monetary value of the at least one loan payment to a lender via a predetermined money transferring system.

In still yet another aspect of the invention, a loan program includes a loan processor; a loan request system in communication with the loan processor and operable for an employee of an employer to request a loan; an authentication system in communication with the loan processor to authenticate at least several underwriting aspects related to the requested loan; a loan amount determination system in communication with the loan processor to determine a total amount of the loan, wherein the total amount of the loan includes a non-principle portion and a principle portion, wherein the non-principle portion is equatable to an interest rate that is not greater than a threshold annual percentage rate per annum; a loan payment determination system in communication with the loan processor to determine a loan payment to be deducted over a number of paydays until the loan is paid-in-full; a loan proceed distribution system in communication with the loan processor to provide a distribution of an amount of loan proceeds equivalent to the principle portion of the loan to the employee via a money transfer arrangement; and a loan payment deduction system in communication with the loan processor for providing paycheck deduction instructions with respect to the employee to a payroll department controlled by the employer, wherein the paycheck deduction instructions include transferring an amount of money that is at least as much as the loan payment to a preferred lender.

In still yet another aspect of the invention, a method for providing loans includes establishing a short term loan program for employees of an employer; receiving a loan request from the employee before a regularly scheduled payday for the employee; determining a loan amount available to the employee based on a threshold annual percentage rate set by the employer; and providing the loan to the employee under a set of loan terms, wherein at least one loan term obligates the employee to a repayment plan for the loan over a number of payroll cycles.

As will be readily appreciated from the described embodiments, the advantages, and the examples provided herein, the complete, end-to-end loan program and process entails a paradigm shift for transacting short term cash loans to employees. The loan program and process advantageously provides a benefit of short term cash loans to employees, where the overall loan costs are significantly reduced. In addition the loan program and process simultaneously provide a benefit to the lender, where the costs of transacting the loan are substantially reduced transaction and where the risks associated with the loan (e.g., missed payments, late payments, and loan defaults) are substantially reduced and these cost saving are passed on to the employee in the form of a short term loan with preferably an APR below an agreed upon maximum APR.

BRIEF DESCRIPTION OF THE DRAWINGS

Preferred and alternative embodiments of the present invention are described in detail below with reference to the following drawings:

FIG. 1 shows an example of a prior art payday loan where an initial payday loan is transacted and then rolled over multiple times with fees paid by the borrow for each rollover;

DETAILED DESCRIPTION OF THE PREFERRED EMBODIMENT

The present invention is generally directed to a loan program and process structured to provide significant end-to-end cost savings while overcoming many, if not all, of the drawbacks and regulatory obstacles present in the current payday loan industry and also overcoming many of the issues facing the conventional banking industry when attempting to process short term loans.

The complete process, from end-to-end, and the overall arrangement thereof, provides numerous advantages such as a lender's ability to offer short-term loans to employees through an employer controlled program where the employer specifies that the loans to the employees are to be provided at or below a fixed or agreed upon annual percentage rate (APR). In addition, the loan program and process is integrated with a payroll system of the employer to mitigate the risk of late or missed payments and ultimately mitigate the risk of loan defaults. As part of the integration of the loan program and process with the payroll system, the employees may be required to open a direct deposit account with the payroll system. Advantageously, the disbursed loan funds may be deposited directly into the employee's direct deposit account, which would mitigate or reduce fraud. By way of example on how fraud could be reduced with the direct deposit system, another person who mistakenly or with ill intent obtains an employee's logon and password, may be able to request a loan, but the loan funds would still be deposited directly into the true employee's direct deposit account and thus inaccessible to the fraudulent person. Reducing or eliminating fraud is yet another way to reduce write offs, which reduces costs, which means that more cost savings could be passed on to the employee.

Yet another advantage of the loan program and process is a repayment plan that permits the total loan to be amortized and repaid over a number of payroll cycles such that each successive payday a principle balance of the loan decreases. Consequently, the loan program and process provides a conforming, amortizing, declining balance loan that is tied to an agreed upon annual percentage rate and where security for payback of the loan is provided via an employer payroll system or department. Other advantages and objectives of the invention will be identifiable and appreciated in the following description.

Figure 4A:
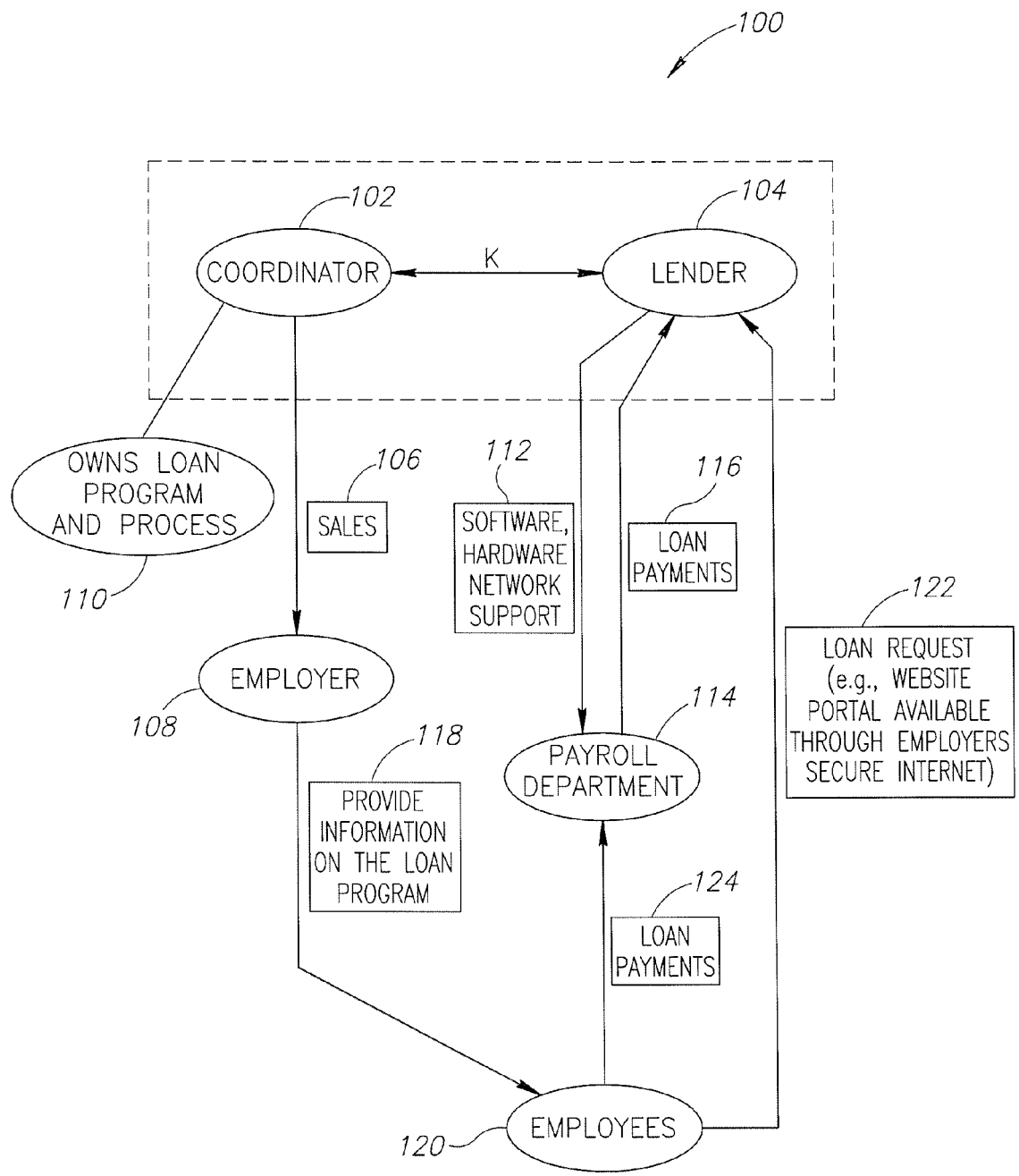
FIG. 4A is a relationship diagram showing various relationships between entities that are involved in a loan transaction, such as a coordinator, a lender, an employer, and an employee, according to a loan program and process that is in accordance with an embodiment of the invention.

FIG. 4A shows a general overview 100 of the various parties and at least some of the interactions that may occur when transacting a loan according to an embodiment of the invention. A coordinator 102 cooperates with a lender 104 through a contractual agreement K. In one embodiment, the contractual agreement K is a license providing that the coordinator 102 is responsible for all sales 106, which involves signing up new employers 108 for a loan program and process 110, as briefly summarized above. In addition, the coordinator 102 may own the rights to at least the loan program and process 110 as well as other intellectual property related to the loan program and process 110. The contractual agreement K further requires that the lender 104 is responsible for being a qualified lender from a regulatory and legal perspective and for developing, maintaining, and installing software, hardware, and network support 112 that will allow a Payroll department 114 to make line item loan payment deductions 116 from an employee's paycheck and forward the deductions 116 to the lender 104 electronically or via other known processes.

Once the coordinator 102 and the employer 108 have agreed to institute the loan program and process 110, the employer 108 is responsible for providing information 118 on the loan program and process 110 to the employees 120. The information 118 provided by the employer 108 may be through a variety of channels, such as the employer's secure intranet website, company announcements, seminars, brochures, posters, fliers, or other employer-controlled media and information channels. In essence, the employer 108 is able to utilize the employer's internal and likely more efficient means of communicating with their employees 120 to make the employees 120 aware of the loan program and process 110. Preferably, the coordinator 102 remains behind the scenes and is not known by the employees 120, or in other words, the coordinator 102 remains in the background from the employees 120 perspective. One purpose for the coordinator remaining behind the scenes is so that the employees appreciate that the loan program and process is controlled and overseen by the employer.

Once the employees 120 have been made aware of the loan program and process 110 through the employer communication channels, the employees 120 may initiate a loan request 122. In one embodiment, the loan request 122 takes the form of an online request made through a loan request system, such as a secure intranet website that links directly to the lender 104. Upon receiving the loan request 122, the lender 104 cooperates with the payroll department 114 to determine a total loan amount and payback amounts, which are the amounts to be deducted periodically from the employee's paycheck when paying the loan off. The total loan amount and payback amounts may be determined using the software, hardware, and network support 112.

After approval and funding of the loan, loan payments 124 are made via an auto-deduction process through the payroll department 114. It is understood that FIG. 4A provides a general overview to identify one embodiment for the various parties and interactions involved in the loan program and process 110 and it is understood and appreciated that additional or fewer parties or interactions may be involved in coordinating and operating the complete loan program and process 110 from end-to-end.

Figure 4B:
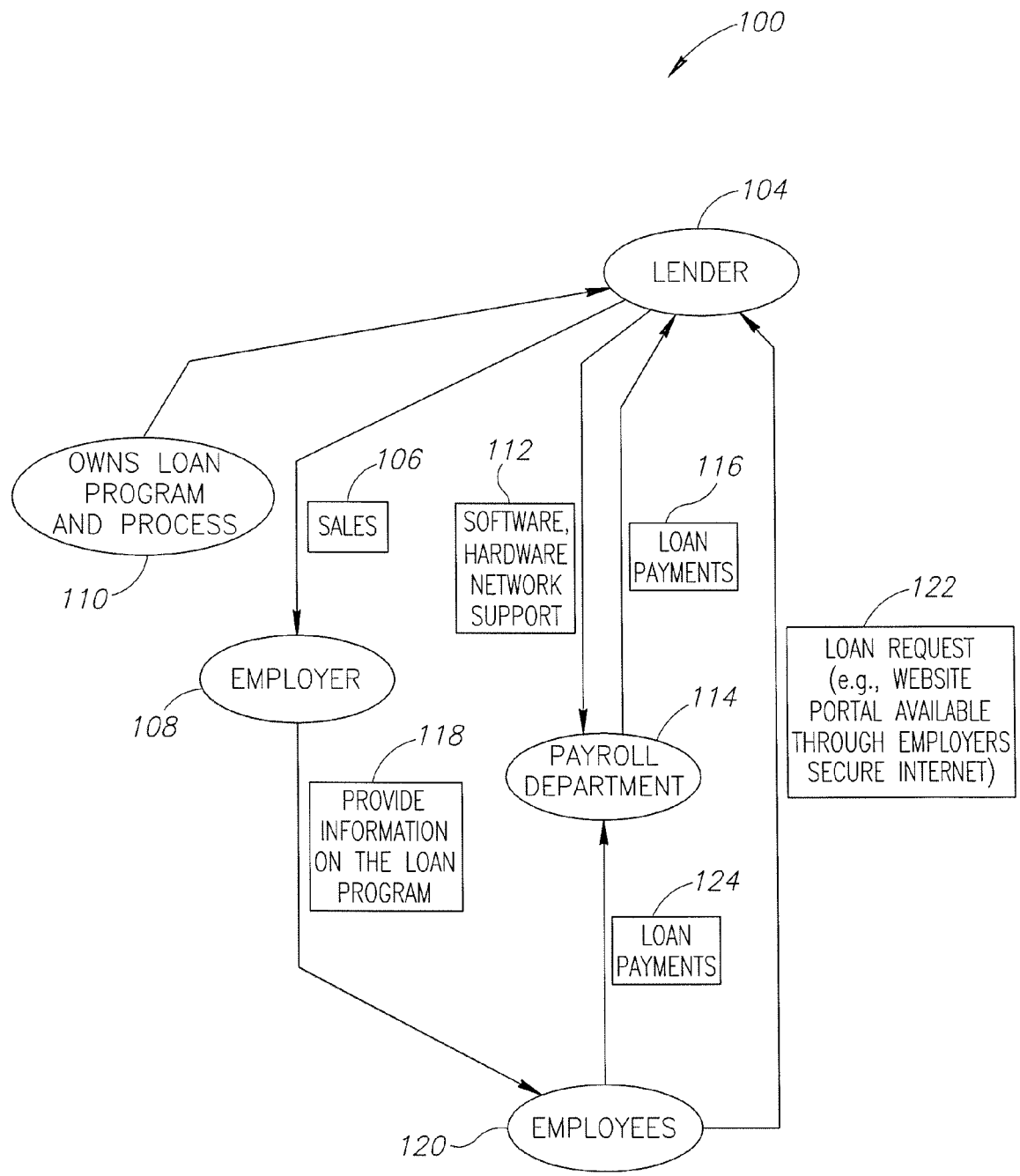
FIG. 4B is a relationship diagram showing various relationships between entities that are involved in a loan transaction, such as a lender that also performs coordinator duties, an employer, and an employee, according to a loan program and process that is in accordance with an embodiment of the invention

For example, FIG. 4B shows an alternate embodiment of the various parties and at least some of the interactions that may occur when transacting a loan according to an embodiment of the invention. In the illustrated embodiment, the duties, rights, and obligations of the coordinator 102 have been incorporated in with or taken over by lender 104. Thus, the lender 104 is responsible for all sales 106 and owns the intellectual property rights related to the loan program and process 110.

Figure 5:
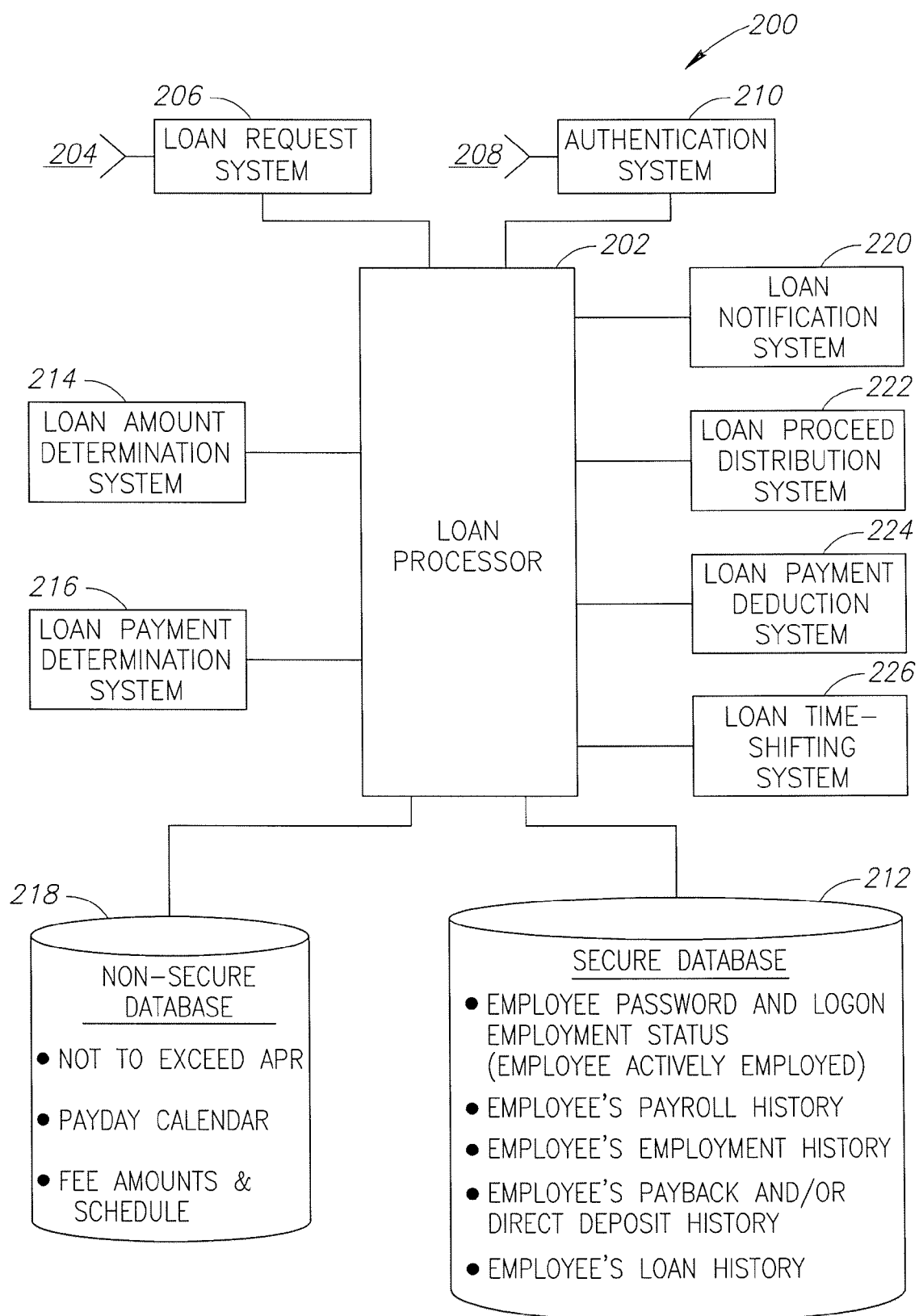
FIG. 5 shows a block diagram of a loan program in accordance with an embodiment of the invention.

FIG. 5 is a block diagrammatic view of a loan program 200 in accordance with an embodiment of the invention. The loan program 200 includes a loan processor 202 operable to receive loan request information 204 from a loan request system 206 and employee authentication information 208 from an authentication or approval system 210. The loan request system 206 may take the form of a website based application that is made available to employees through a network connection, such as a secure or non-secure website. The employee supplies the required loan request information 204 into the loan request system 206. Similarly, a payroll system or department, an employer, or some combination thereof, provides authentication information 208 to the authentication system 210. The payroll system or department may be operated by a third party (i.e., outsourced or contracted). For example, the authentication system 210 may obtain information from a secure database 212 operated by the employer or a third party having permission from the employer.

The authentication system 210 may obtain, for example, the employee's employment status or history, the employee's payroll or direct deposit history, the employee's loan history, the employee's employment history, and verify the employee's password and logon information. It is appreciated these parameters are not all inclusive and that some or all of this information may be stored in a non-secure or other database. With these parameters, the authentication system 210 may determine that the employee is actively employed and that the employee has an adequate paycheck loan history with sufficient net proceeds to support the requested loan amount. In addition, the authentication system 210 may be configured to check other types of parameters such as credit scores, child support obligations, bankruptcy filings, pending civil or criminal matters, payday loan history, etc.

In one embodiment, the authentication system 210 may be used to batch process and thus pre-approve a large number of employees of the employer for a small, short term loans. Accordingly, a pre-approved employee could quickly request the pre-approved loan funds at any time, pending a brief questionnaire to insure that no major changes have impacted the pre-approved employee. The pre-approved loan funds would not have to be used by the pre-approved employee until actually needed, which may be never.

Once the loan request system 206 and the authentication system 210 have cooperated with the loan processor 202 to at least temporarily approve the employee's loan request, a loan amount determination system 214 determines a total amount of the loan. In one embodiment, the loan amount determination system 214 merely provides a fixed loan amount in relation the employee's level within the company. In another embodiment, the loan amount determination system 212 provides a loan amount that has been statistically determined to be an amount that has a high likelihood of being paid back over time without causing undue hardship to the employee. In yet another embodiment, the loan amount determination system 212 may vary the loan amount based on factors such as the employee's salary, whether the employee is a shareholder, the circumstances for the loan, etc. Thus, although the loan program 200 is generally directed to assist the lower income employees, the loan program 200 described herein is not limited to such. In one embodiment, the loan program 200 may be used any employee, each requesting various loan amounts for various reasons.

Once the loan amount has been determined, a loan payment determination system 216 determines the payment amount that is to be deducted from the employee's paychecks over a number of future pay cycles. The loan payment determination system 214 may use input from a non-secure database 218, which includes data provided by the coordinator 102, lender 104, or some other party. By way of example, the non-secure database 218 includes a "not-to-exceed" or threshold APR, which was the APR specified by the employer 108 (FIG. 4). The non-secure database 218 may further include data for a payday calendar for the employer 108 (i.e., the number and dates of the paydays for a given period of time) and any fee amounts and fee schedule that may be applied to a loan at various stages of the loan request and payback process.

By way of example, the loan payment determination system 216 may determine a loan payment based on the loan amount, the "not-to-exceed" APR, a preferred number of paydays to repay the loan, a payoff deadline date, a fee schedule with predetermined fees, etc. It is appreciated that a variety of variables and parameters may go into the loan payment determination system 216, to include, but not limited to, the previously identified information.

The APR is basically a comparison parameter for indicating the true cost of various loans and for determining whether the lender has included any hidden fee. The APR and the interest rate are different from each other. The APR takes into account extra costs along with the normal interest rate. These extra costs vary from one lender to another and hence the APR varies. However, in case of loans having no extra cost, the APR is same as the interest rate.

The APR is a measure of the cost of credit, expressed as a nominal yearly rate. In short, the APR is the equivalent interest rate (considering all additional costs) charged on a certain loan amount. It is a function of the principle loan amount, interest rate, total additional cost, and the loan term. The fees included within the APR may vary from one lender to another. The fees included within the APR generally involve charges related to the making of the loan and other fees, for example a loan transaction fee, a credit report fee, a loan processing fee, an underwriting fee, a document preparation fee, a loan application fee, and credit life or loan security insurance.

The APR is defined by the Federal Deposit Insurance Corporation (FDIC) pursuant to the Truth in Lending Law enacted in 1968 and specifically in Regulation Z, Part 226, which came into effect on Jul. 1, 1969. By this law, a creditor is bound to disclose the APR to a borrower within three days of receipt of loan application. The creditor cannot hide the extra costs and is liable to reveal all the costs along with the interest rate to the borrower before signing any agreement.

It is appreciated that different lenders may use different methods for calculating the APR. The most prominent and scientific method is the Newton-Raphson method, which is widely used by different creditors. Mathematically, the Newton Raphson Method is provided as follows: $[a(1+a)n/(1+a)n-1]-P/C=0$. Thus, the APR may be broadly viewed as a function: $APR=f(P, I, A, N)$, where P=principal loan amount; A=additional costs; I=interest rate; and N=number of months.

By way of example and according to yet another embodiment, the APR rate fee calculation process may proceed as provided by the following example using the following loan term assumptions: Loan Amount=$400; APR=30%; Term=4 equal pay periods, each 30 days apart. The first payment occurs on Day 30 and comprises a Principle Repayment Amount of $100.00 and an Interest Amount of $9.86. The total deduction is $109.86 and leaves a Principle Loan Balance of $300. In this example, the interest is computed as: (30%*$400=$120 per year/365=$0.33 interest per day*30 days=$9.86).

The second payment occurs on Day 60 and comprises a Principle Repayment Amount of $100.00 and an Interest Amount of $7.40. The total deduction is $107.40 and leaves a Principle Loan Balance of $200. In this example, the interest is computed as: (30%*$300=$90 per year/365=$0.25 interest per day*30 days=$7.40).

The third payment occurs on Day 90 and comprises a Principle Repayment Amount of $100.00 and an Interest Amount of $4.93. The total deduction is $104.93 and leaves a Principle Loan Balance of $100. In this example, the interest is computed as: (30%*$200=$60 per year/365=$0.16 per day*30 days=$4.93).

The last payment occurs on Day 120 and comprises a Principle Repayment Amount of $100.00 and an Interest Amount of $2.47. The total deduction is $102.47 and pays off the loan in full—leaving a Principle Loan Balance of $0. In this example, the interest is computed as: 30%*100=$30 per year/365=$0.08 per day*30 days=$2.47). In summarizing the above-example, the total principle paid was $400, the total interest paid was $24.66, and the total loan amount was $424.66.

The loan program 200 may further include systems for approving, distributing, deducting, and time-shifting the loan. In the illustrated embodiment, a loan notification system 220 notifies the lender, the employer, and the employee that the loan is now in a form where it may be accepted by the employee. The employee, via interaction with the loan request system 206 for example, receives a message to either accept or decline the loan in accordance with a set of terms and conditions. The employee may electronically accept the loan, for example, by clicking an ACCEPT or a YES button on a computer screen. The loan acceptance and approval process may be accomplished with e-documents and using e-signatures and thus be fully automated according to one embodiment.

The loan proceed distribution system 222 receives a signal that the loan has been accepted by the employee. The loan proceed distribution system 222 informs the lender to release the funds and forward the funds to the employee within a reasonable time, for example within twenty-four hours. Depending on the input from the employee through the loan request system 206 or depending on existing protocol established by the lender or employer, the distribution of the funds may take a variety of forms, for example a money order, cashier's check, cash, an EFT transaction, electronic check, checking or savings account deposit, a transfer via an Automated Clearing House (ACH) network, or any other equivalent technique available for transferring funds.

A loan payment deduction system 224 will receive notification that the funds to the employee have been distributed and received. At this time, the loan payment deduction system 224 will add the employee onto a list of employees having outstanding loans, store the payment dates, to include a final payoff date, the payment amounts, which are taken from the loan payment determination system 216 described earlier, and store any other information that may be relevant to the payment amounts from the employee. The loan payment deduction system 224 cooperates with the payroll department of the employer by providing payment deduction instructions prior to each pay cycle and for each employee with outstanding loans. For example, the instructions may tell the payroll department to withdraw $105 from a first employee's post-tax paycheck amount and forward the $105 to a first lender via an EFT transaction. In one embodiment, the employee may be able to interact with the loan payment deduction system 224 after the loan has been approved to renegotiate or change the repayment parameters of the loan.

Yet another system that may cooperate with the loan processor 202 is a loan time-shifting system 226. The loan time shifting system 226 may cooperate with the loan payment determination system 216 to adjust the payoff schedule, the interest rate, the fees, or some other parameter when the employee requests a loan outside of a designated window of time. For example, many payroll departments freeze time entries, travel reimbursement entries, expense entries, etc. at a particular date each month, for example ten days before a regularly scheduled, monthly payday. Thus, if an employee requests a loan within this ten-day window, the employee will still receive the loan in a timely manner, but not be put into the system until after the scheduled payday with a first payment being the following end-of-the month payday. In essence, the employee would have ten extra days to use the money. Accordingly, the time-shifting system 226 could include an appropriate amount of fees, interest, or other because the employee requested the loan outside of the designated window. It is anticipated that the time-shifting system 226 would work in parallel with the loan payment determination system 216 via the loan processor 202.

In summary, the loan program 200 offer borrowers (employees) 120 an amount of money, for example a fixed amount of money or an amount that may be determined by examining a number of loan underwriting parameters, obligate the employee 120 to an auto-deduction repayment play over a fixed number of payroll cycles. In addition, the loan program provides a loan that accrues daily interest at or below an agreed upon APR. In one embodiment, the daily interest that accrues on the loan may be less than the agreed upon APR as a means to account fees and other ancillary costs, which are described in greater below. Finally, the loan program retains an amount of flexibility that permits employees to request and receive loans at all times during a month, even if the request is made within a payroll "freeze" window. In such an instance, the loan program provides that a final payoff deadline for the loan may be extended by one extra payday cycle. In addition, an additional fee may be applied to the loan, but again the APR will be maintained at or below the not-to-exceed or threshold APR. These advantages, as well as many other advantages, operate to provide a loan program and process that is likely to revolutionize the conventional lending and the payday lending industries. The loan program and process allows for a reduction of overall costs associated with providing, processing, and collecting small loans and allows the employee to receive the loan at an overall lower cost and in a more convenient manner. The loan program and process substantially reduces the overall costs of a small, short term loan and gives these cost savings back to the employees in the form of a lower or reduced APR.

Figure 6:
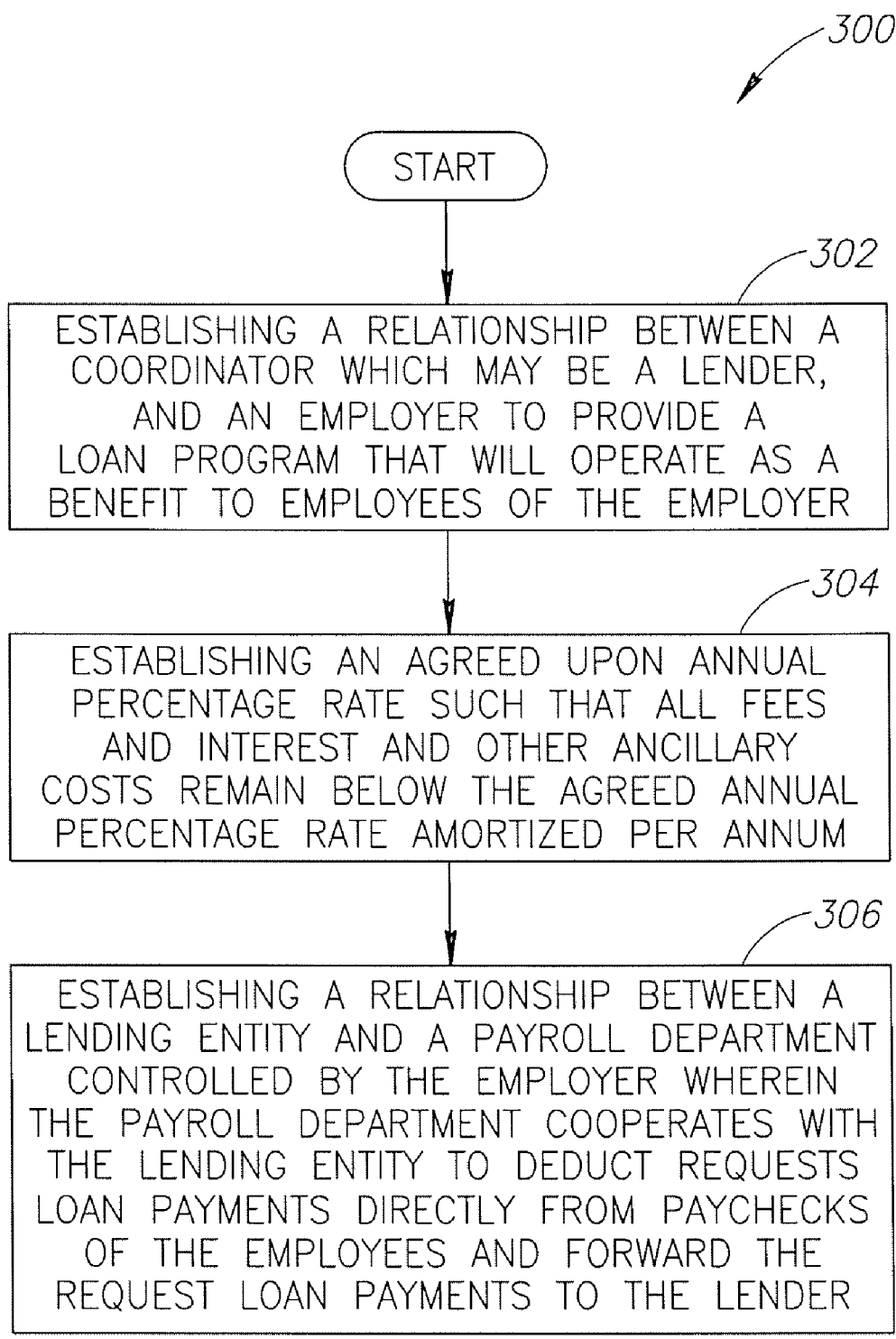
FIG. 6 shows a flowchart illustrating a method of coordinating a loan program in accordance with an embodiment of the invention.

FIG. 6 shows a method 300 for coordinating a loan in accordance with an embodiment of the invention. In the description herein, please refer back to FIG. 4 to identify the entities and the interactions involved in the method 300. A coordinator 102 creates a loan program that advantageously provides a much less expensive short term loan when compared to the current "payday loans" offered by the payday lending industry. The coordinator 102, for the most part, operates behind the scenes and forms the foundation that brings all the other entities into a desired working or interactive relationship. In one embodiment, the coordinator 102 owns the loan program and process 110. In addition and as shown in step 302, the coordinator 102 actively seeks out and establishes a relationship with an employer 108 to provide a loan program 110 that the employer 108 could offer as a benefit to employees 120. Thus, the coordinator 102 operates as a sales entity 106 by promoting the loan program 110 to various employers 108. For example, the coordinator 102 may attempt to form relationships with large employers 108 since the employees 120 thereof are the ones to likely benefit the most from the loan program and process 110. In another embodiment, the lender 104 takes on the roles of both the lender 104 and the coordinator 102.

In one embodiment, the coordinator 102 establishes a relationship with at least some portion of the United States military or for example, the Department of Defense. Establishing the relationship may include forming a contractual agreement between the coordinator and the employer. The loan program and process 110 may be structured and tailored to meet the various needs and requests of the military while remaining clearly within the boundaries of the law, in particular Public Law 109-364, otherwise referred to as the John Warner National Defense Authorization Act. In another embodiment, the coordinator 102 establishes relationships with other employers 108, for example, WalMart®, Sears®, Costco®, Kroger®, Target®, etc. In yet another embodiment, the coordinator 102 establishes relationships with payroll or benefit providers (i.e., third party providers that work with employers).

In step 304, the coordinator 102 contracts with a lender 104 for the lender 104 to operate as the lending entity for the loan program 110. In addition, the coordinator 102 enters into an agreement with the employer 108 to establish an agreed upon APR, where the APR includes all fees, interest, and other ancillary costs for the loan over the entire duration of the loan per annum. The APR may be contractually obligated such that every loan conforms to the agreed upon APR.

By way of example, the coordinator 102 and the employer 108 agree to an APR of 28% for all loans provided to employees 120 that make less than a threshold annual amount of income, that fall within a certain credit risk pool, or that fall above a predetermined parameter that identifies the employee's ability to repay the loan. Thus, the lender 104, after receiving a loan request 122 from one of the employees 120 would structure the loan to have a principle balance. In addition to the principle balance, the lender 104 may then increase the total amount of the loan via any combination of simple or compound interest, various types of fees or charges, or other ancillary costs, in which the latter is generally defined as any product or service that comes with the loan. Some examples of ancillary costs are loan service charges, renewal charges, credit insurance premiums, and life or disability insurance premiums (e.g., if the employee becomes deceased or injured then the insurance will pay off the loan). In sum, a combined total amount of the interest, fees, and ancillary costs for the loan must remain below the APR of 28% per annum.

Step 306 shows that in addition to structuring the loan as described above, a relationship between the lender 104 and a payroll system or department 114 controlled by the employer 108 is established. The establishment of the relationship between the lender 104 and the payroll department 114 may be facilitated by the coordinator 102. The lender 104 cooperates with the payroll department 114, and vice-versa, in that the payroll department 114 deducts requisite loan payment amounts directly from paychecks of the employees 120 and transmits these loan payment amounts to the lender 104 to reduce the representative outstanding loan balances of the employees 120 that have outstanding loans with the lender 104. As an alternative the loan program 100 may include an application programming interface (API) that permits the employer to electronically and automatically deduct the loan payments from the employee's paycheck.

In an alternative embodiment, the payroll department 114 cooperates with the first lender 104 for transacting small, short term loans for employees 120 making less than the threshold annual amount of income and further cooperates with a second lender (not shown) for transacting medium sized, short term loans for employees making greater than the threshold annual amount of income. Regardless of the size of the requested loan, the loan program may be configured to meet the needs of various types of employees within various levels in the company. Consequently, one of the overriding advantages of the loan program and process described herein is to provide a loan to an employee, where the loan funds are quickly accessible, the transactions are kept to a minimum, and the party making the loan has the security of knowing that the loan payments will be taken directly from the employee's paycheck, thus substantially preventing the employee from circumventing the loan payback process.

Figure 7:
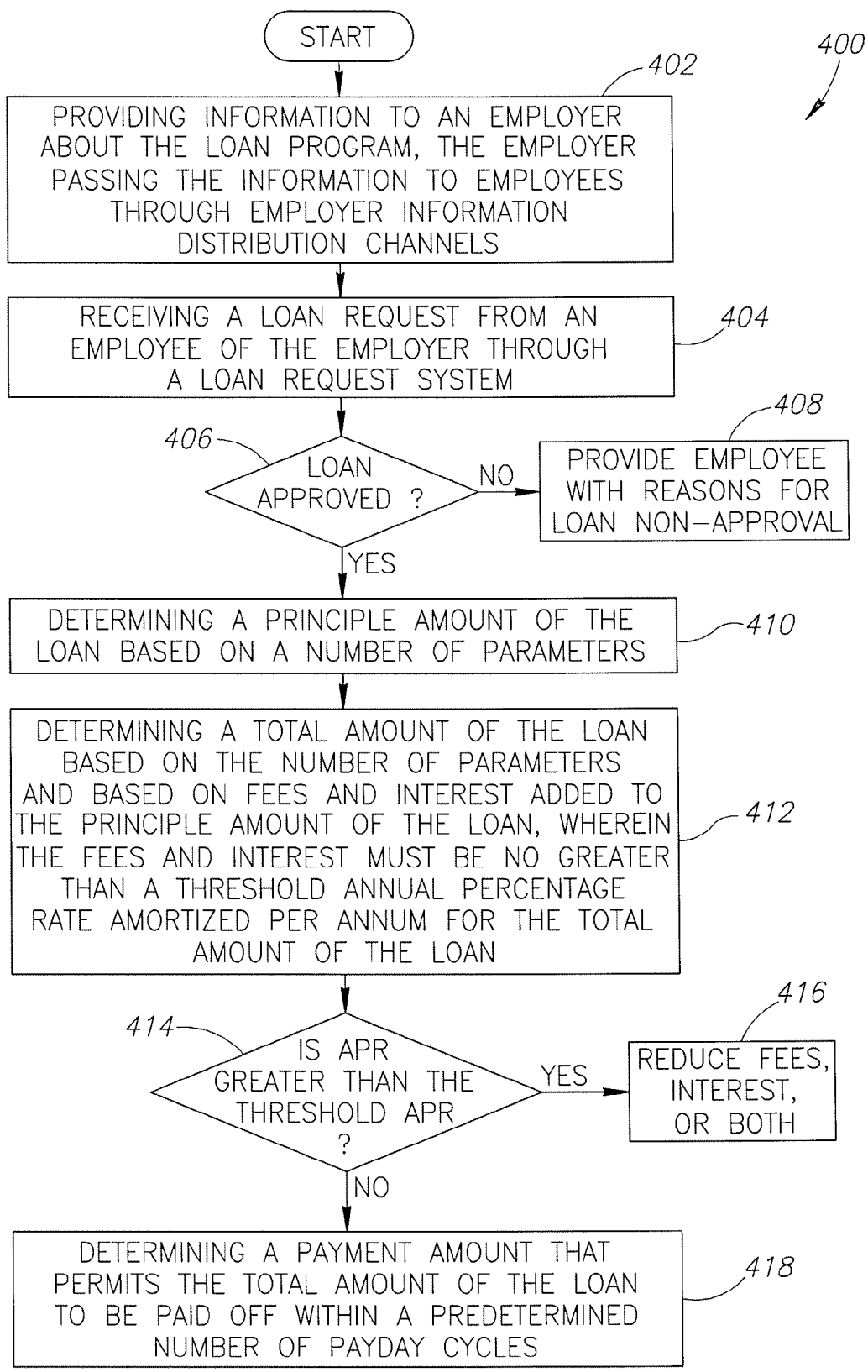
FIG. 7 shows a flowchart illustrating a method of providing a loan through a loan program involving at least an employer, an employee, and a lender in accordance with an embodiment of the invention.

FIG. 7 shows a method 400 for providing a loan through a loan program in accordance with an embodiment of the invention. Again and in the description herein, please refer back to FIG. 4 to identify the entities and the interactions involved in the method 400. At step 402, a coordinator 102 provides information to an employer 108 about a loan program 110. The employer 108 passes the information to employees 120 through employer information distribution channels. For example, the employer 108 makes the employees 120 aware of the loan program 110 through a secure intranet site, print, digital, and video media channels controlled by the employer 108, word of mouth, seminars, group meetings, and the like, and any other means available to an employer 108 for bringing information to the attention of employees 120 that are employed by the employer 108.

At step 404, an employee 120 makes a loan request through the loan request system 206 (FIG. 5). The loan request may be for a single, fixed amount of money, may define a range of money, or may identify several discrete amounts of money. The loan request system 206 operates as a front end user interface for the employee 120 logs into a computer terminal using a logon identifier and a password. The employee 120 opens the loan request program 206, which may appear as a graphical icon on a computer screen. Through a variety of input/output (I/O) devices, the employee 120 is directed through the loan request process.

At step 406, a determination is made as to whether the loan request is approved or denied for the requested loan amount. If the requested loan is denied, then at step 408 the employee 120 receives feedback through the loan request program 206 with a reason or reasons as to why the requested loan was denied. For example, the requested loan may be denied after a review of one or more loan underwriting parameters. In one embodiment, one of the loan underwriting parameters is the employment status of the employee 120. The employment status may initially be checked against information in the employer's secure database 212 (FIG. 5). If the database 212 indicates that the employee 120 is on the active payroll, then a secondary, back-up check made in real time may be placed with the employer 108 to insure that no recent changes have occurred with the employee 120. Thus, one reason for denying the requested loan may be that the employer 108 recently received a resignation letter from the employee 120. After the loan is approved, the loan funds are disbursed to the employee 120 after the employee 120 electronically agrees to the terms of the loan, to include the payback terms of the loan. In one embodiment, the employee 120 agrees to such terms using an e-signature through the loan request system 206.

Additionally or alternatively, other underwriting parameters may be the employee's gross income or job tenure. Thus for example, this information may be obtained from the employer's payroll system or from the employer's secure database 212. By way of example, a $400 loan may not be approved for gross incomes under a certain amount per month for safety and soundness reasons. Or, an employee that has been employed for less than a certain number of months may be deemed too much a risk.

At step 410 and after approval of the requested loan, a principle amount of the requested loan is determined based on a number of underwriting parameters. In one example, one underwriting parameter for determining the principle amount of the requested loan is the average, monthly net pay for the employee 120. In another example, another underwriting parameter for determining the principle amount of the requested loan is the circumstance for which the loan is requested (e.g., dire emergency versus a less-than dire situation). It is appreciated that the underwriting parameters described herein, in addition to other underwriting parameters, may be used singularly or in combination to determine the principle amount of the requested loan.

At step 412, a total amount of the loan is determined based on, but not necessarily limited to, one or more loan transaction parameters. Some examples of loan transaction parameters are a simple or compound interest rate, a loan fee (e.g., transaction, application, processing, or other type of loan fee), and other ancillary costs associated with the loan. The aggregate cost of the loan transaction parameters however, may not exceed a threshold APR per annum, in which the threshold APR is the APR agreed upon between the coordinator 102 and the employer 108, as discussed above. Accordingly, the total amount of the loan includes the principle balance of the loan with all of the aforementioned, aggregated costs.

One aspect that may affect the total amount of the loan is the time at which the loan is requested, for example, the loan fee may vary depending on which day of the month the loan was requested, but nevertheless, the total amount of the loan will still meet the threshold or not-to-exceed APR %.

At step 414, the method 400 determines whether the APR is greater than the threshold APR. If yes, then in step 416 the total amount of the loan is re-determined. If no, then at step 418 a payment amount for the total amount of the loan is determined such that successive payment amounts when deducted from the employee's future paychecks over a predetermined number of payday cycles will result in the total amount of the loan being paid in full. In addition, the employee 120 will be notified of the total amount of the loan.

Figure 8:
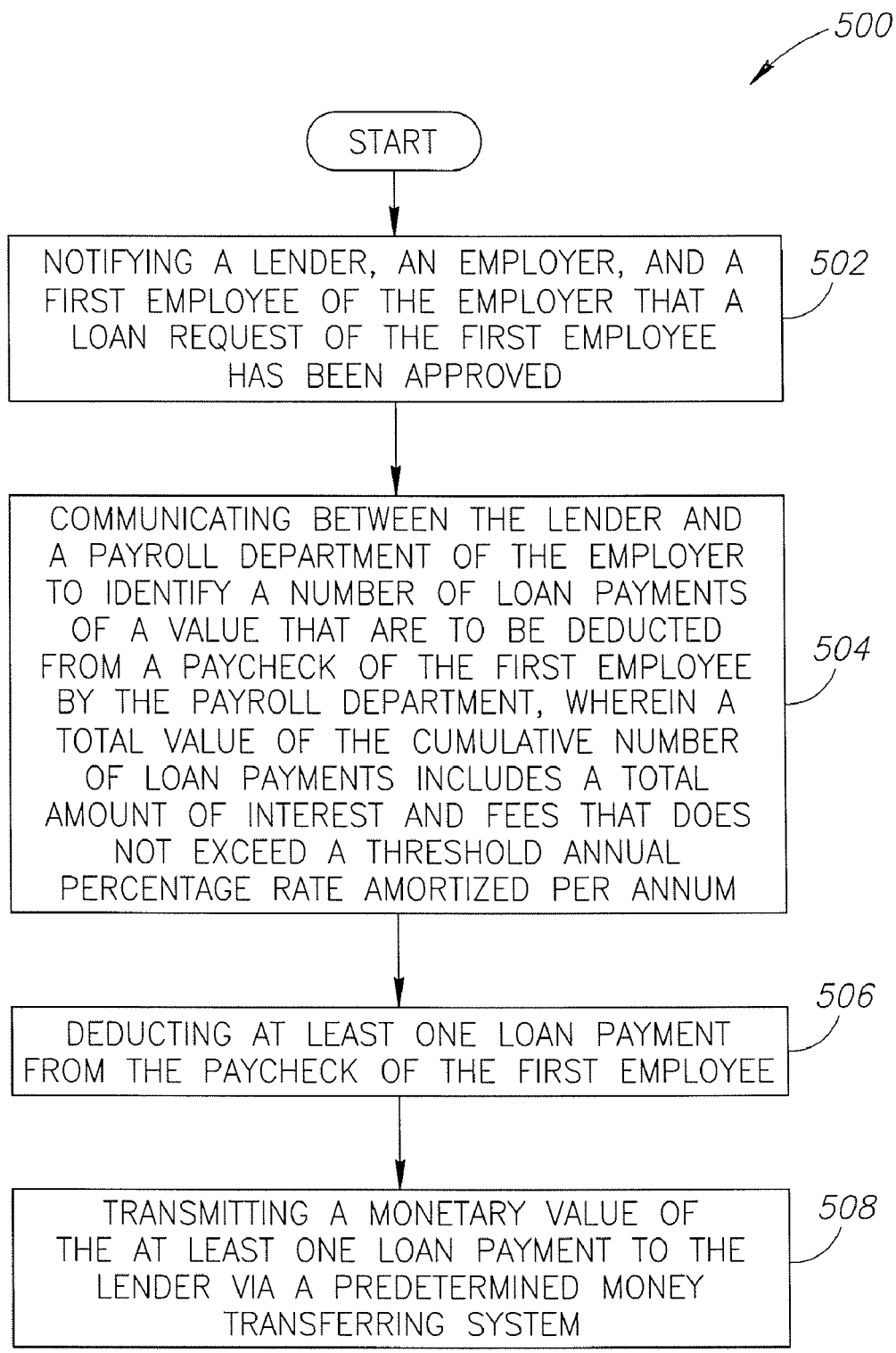
FIG. 8 shows a flowchart illustrating a method of achieving reimbursement of a loan through a loan program involving at least an employer, an employee, an employee control payroll system, and a lender in accordance with an embodiment of the invention.

FIG. 8 shows a method 500 for achieving reimbursement of a loan through a loan program in accordance with an embodiment of the invention. Again and in the description herein, please refer back to FIG. 4 to identify the entities and the interactions involved in the method 500. At step 502, a lender 104, an employer, and a first employee 120 are notified that a loan request submitted by the first employee 120 has been approved. At step 504, lender 104 communicates with a payroll department 114 of an employer 108 to identify a number of loan payments to be deducted from a paycheck of the first employee 120. As described above and which will not be further elaborated on herein, the total amount of the loan includes the principle amount in addition to any loan transaction costs, such as fees, interest, or other ancillary costs. The loan transaction costs, per agreement, contract, stipulation, or otherwise, must remain at or below a threshold APR per annum.

At step 506, at least one loan payment from the paycheck of the first employee is deducted. It is appreciated that the deduction, and subsequent deductions, may take the form of auto-deductions from the payroll department 114. In one form, the auto-deduction is similar in form and function to other paycheck deductions, for example a deduction for a 401K contribution, a deduction for a medical insurance premium, a deduction for child support, or a deduction for a 401K loan payment. In short, the auto-deduction simply appears as a line item deduction on the paycheck of the employee 120. In an alternate embodiment, the amount of the loan payment may be varied, for example loan payments that decrease or increase in the amount of the payment over time, or the amount of the loan payment may be negotiable in that the employee could renegotiate the payback terms of the loan before the loan is actually paid off.

At step 508, a monetary value of the at least one loan payment is transferred to the lender 104 via a predetermined money transferring system. In one embodiment the money transferring system may take the form of an EFT transaction processed through the Automated Clearing House.

The loan program and process described above provides numerous and significant advantages over the practices of the current payday lending industry and over the environment in which conventional financial institutions are able and willing to provide short term loans. The loan program and process described herein allows a behind-the-scenes coordinator to contract with the employer to deliver the loan program and process as a benefit for the employees of the employer at an agreed upon APR. The fixed or threshold APR advantageously solves the problem of providing short term loans at a reasonable cost to the employees and does away with the current practice of providing short term loans at an APR of 400%, or higher, for example. In addition, the fixed or threshold APR provides that the loans provided by the loan program and process will be maintained within the boundaries of some recently enacted legislation or at least can be structured to be within such boundaries.

Figure 2:
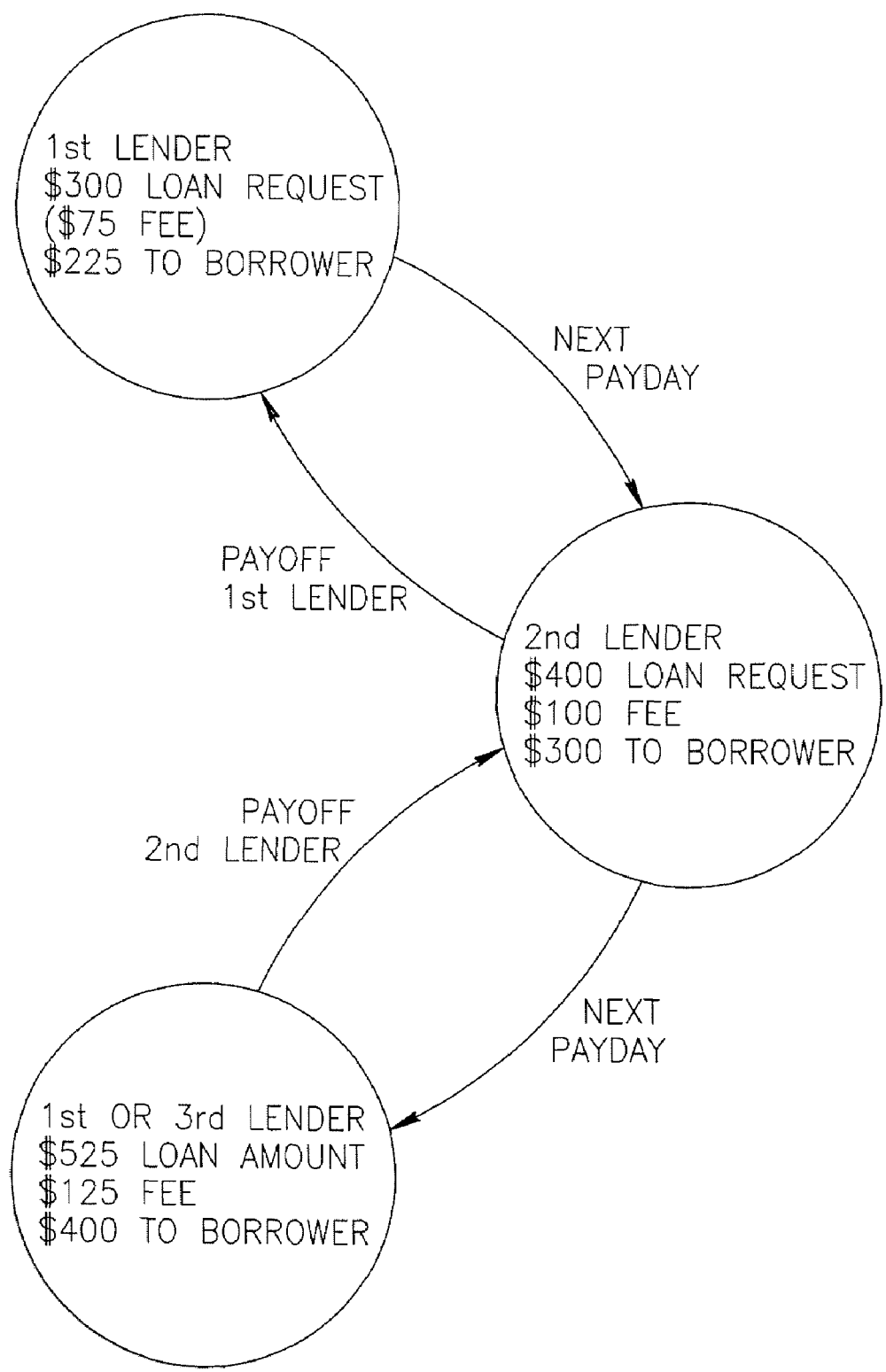
FIG. 2 shows another example of a prior art payday loan where an initial payday loan is transacted and then subsequently paid off when a borrower transacts a new payday loan to cover the previous, outstanding payday loan.
Figure 3:
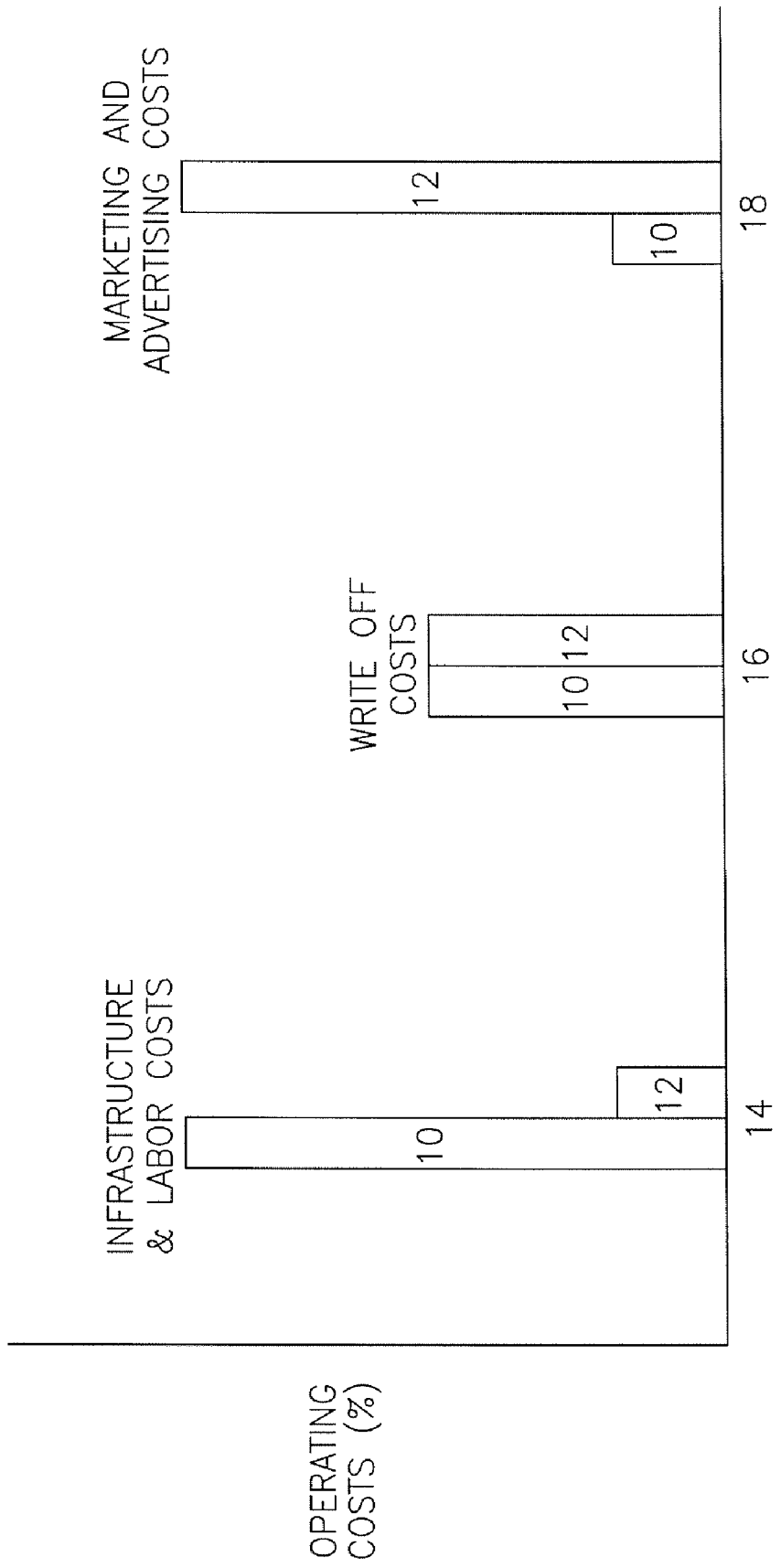
FIG. 3 shows an operating cost comparison between a prior art brick and mortar payday loan vendor and a prior art online payday loan vendor.

Another advantage aspect of the present invention is that the coordinator and owner of the loan program and process is able to create marketing/awareness of the program through the employer's existing communication channels (intranet, email, cafeterias, break rooms, check stub messaging, inserts, etc). By bringing awareness of the program through these channels, the marketing and advertising costs to the coordinator are substantially lower than those of the online payday lender 12 (see marketing and advertising costs 18 in FIG. 3). In addition, the marketing and advertising costs to the coordinator may also be lower than those of the brick and mortar payday lender 10 (see marketing and advertising costs 18 in FIG. 3).

Yet another advantage of the loan program and process is that the employee may request, process, and transact the loan through secure and private channels via the employer's secure intranet. This protects the employee from putting information on a commercial web site like the online loan payday lenders require today. In addition, the employee's information stays private, for example their email, phone number, etc. is not sold or traded.

Yet another advantage of the loan program and process is that the loan payments are auto-deducted from the employee's paycheck via the employer controlled payroll department. As such, this auto-deduction process greatly reduces write off costs, which is a major cost component within the current payday loan industry. Advantageously, the cost savings achieved from the auto-deduction process and from the reduced transaction costs are passed back to the employees via a lower, agreed upon APR, for example.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A method of coordinating a loan program, comprising:
    executing a contract between a lending entity and an employer to provide a loan program for on-demand, small loans that is offer-able as a benefit through the employer to employees of the employer, the contract having an annual percentage rate set by the employer, and wherein the annual percentage rate includes fees, interest, and other ancillary costs, which taken in total provides an overall interest rate that is less than or equal to the annual percentage rate; and
    deducting loan payments directly from paychecks of the employees and transmitting the loan payments to a lending entity to reduce the representative outstanding loan balances of the employees with outstanding loans over a plurality of pay periods.

2. The method of claim 1, wherein executing a contract between a first entity and an employer includes executing a contract between a coordinator and the employer.

3. The method of claim 1, wherein having at least the agreed upon annual percentage rate includes an annual percentage rate in a range of about 0%-36%.

4. A loan program comprising:
    a loan processor;
    a loan request system in communication with the loan processor and operable for an employee of an employer to request a loan;

an authentication system in communication with the loan processor to authenticate at least several underwriting aspects related to the requested loan;

a loan amount determination system in communication with the loan processor to determine a total amount of the loan, wherein the total amount of the loan includes a non-principle portion and a principle portion, wherein the non-principle portion is substantially equal to an interest rate that is not greater than a threshold annual percentage rate set by the employer;

a loan payment determination system in communication with the loan processor to determine a loan payment to be deducted over a plurality of paydays until the loan is paid-in-full;

a loan proceed distribution system in communication with the loan processor to provide a distribution of an amount of loan proceeds equivalent to the principle portion of the loan to the employee via a money transfer arrangement; and a loan payment deduction system in communication with the loan processor for providing paycheck deduction instructions with respect to the employee to a payroll department controlled by the employer, wherein the paycheck deduction instructions include transferring an amount of money that is at least as much as the loan payment to a preferred lender.

5. The loan program of claim 4, wherein the loan request system includes an interactive website portal accessible by the employee through a secure intranet of the employer.

6. The loan program of claim 4, further comprising a secure database in communication with the loan processor and having employee information.

7. The loan program of claim 4, wherein the threshold annual percentage rate is a not-to-exceed annual percentage rate in a range of about 0-36% and established by the employer.

8. A method for providing loans comprising:

establishing a short term loan program for employees of an employer;

receiving a loan request from the employee before a regularly scheduled payday for the employee;

determining a loan amount available to the employee based on a threshold annual percentage rate set by the employer; and providing the loan to the employee under a set of loan terms, wherein at least one loan term obligates the employee to a repayment plan for the loan over a plurality of payroll cycles.

9. The method of claim 8, wherein determining the loan amount available to the employee based on the threshold annual percentage rate includes combining all fees and interest associated with the loan to achieve the threshold annual percentage rate.

10. The method of claim 8, wherein determining the loan amount available to the employee includes the threshold annual percentage rate set by the employer to be in a range of about 0 to 36%.

* * * * *